US006078053A

United States Patent [19]

Adam et al.

[11] Patent Number: 6,078,053

[45] Date of Patent: Jun. 20, 2000

[54] X-RAY IMAGE ERASURE METHOD

[75] Inventors: Benoit Adam, Longueuil; Bradley Trent Polischuk, Pierrefonds, both of Canada

[73] Assignee: ANRAD Corporation, Saint-Laurent, Canada

[21] Appl. No.: 09/041,014

[22] Filed: Mar. 12, 1998

[30] Foreign Application Priority Data

Mar. 20, 1997 [CA] Canada .................................. 2200532

[51] Int. Cl.[7] ...................................................... G01T 1/24

[52] U.S. Cl. ............................... 250/370.09; 250/370.08; 250/371

[58] Field of Search .................................... 250/588, 581, 250/370.08, 370.09, 370.12, 370.13, 371

[56] References Cited

U.S. PATENT DOCUMENTS

| | | | |
|---|---|---|---|
| 5,319,206 | 6/1994 | Lee et al. | 250/370.09 |
| 5,371,377 | 12/1994 | Struye et al. . | |
| 5,563,421 | 10/1996 | Lee . | |
| 5,661,309 | 8/1997 | Jeromin et al. | 250/580 |
| 5,665,976 | 9/1997 | Arakawa | 250/588 |
| 5,920,070 | 7/1999 | Petrick et al. | 250/370.09 |
| 5,925,890 | 7/1999 | Van Den Bogaert et al. | 250/580 |
| 5,969,360 | 10/1999 | Lee | 250/370.09 |

*Primary Examiner*—Constantine Hannaher
*Assistant Examiner*—Albert Gagliardi
*Attorney, Agent, or Firm*—George J. Primak

[57] ABSTRACT

Erasure of an x-ray imaging device is performed by applying high voltage and erasing light simultaneously. The polarity of the high voltage may be reversed during the erasure operation. This produces an erasure that eliminates non-uniformities or ghosts arising from a previous image.

15 Claims, 8 Drawing Sheets

X-RAY IMAGE ERASURE METHOD

BACKGROUND OF THE INVENTION

1. Field of the Invention

This invention relates to a method of erasure of x-ray images in such a manner as to eliminate the non-uniformities or ghosts arising from a previous image. More particularly, the invention relates to a method of erasure of an x-ray imaging device which uses high bias voltage during the image capture process.

2. Brief Description of the Prior Art

It is well known to use light to erase an image remaining on an x-ray plate. This is done for x-ray plates which use a stimulable phosphor medium as disclosed, for example, in U.S. Pat. No. 5,371,377 of Dec. 6, 1994, where light containing two distinct or separate emission bands is employed. This is also done for x-ray image capture panels where the photoconductive layer is made of a material such as amorphous selenium, lead oxide, thallium bromide, cadmium telluride, and the like which directly capture radiographic images as patterns of electrical charges, and where a high bias voltage is applied during the image capture process. Such a method is disclosed, for example, in U.S. Pat. No. 5,563,421 of Oct. 8, 1996 in conjunction with a special image capture panel, wherein the radiation sensitive layer is exposed to two uniform patterns of light, one after the other, in order to substantially eliminate residual electrical charges remaining in the photoconductive layer.

As mentioned in this U.S. Pat. No. 5,563,421, such electrical charges have also been minimized by the application of a reversed and decreasing electric field, however this involves multiple applications of such field.

Despite these various procedures, it has been found that non-uniformities or ghosts arising from a previous image still often remain on the x-ray imaging device.

OBJECTS AND SUMMARY OF THE INVENTION

It is an object of the present invention to provide a method for erasure of an x-ray imaging device so as to completely or essentially completely eliminate the non-uniformities or ghosts arising from a previous image.

A further object of the invention is to achieve such erasure in a simple, efficient and inexpensive manner.

Other objects and advantages of the invention will be apparent from the following description thereof.

In essence, it has been surprisingly found that erasure of an x-ray imaging device, where a previous image has been obtained with application of a high voltage bias during the imaging process, can be significantly improved by also applying a high voltage bias to the x-ray imaging device when exposing the device to erasing light. Once erasure is complete, the high voltage is turned off before turning off the light. It is preferable, although not essential, to use the same magnitude of high voltage bias during imaging as during erasure.

The x-ray imaging device that may be treated in accordance with the novel process will normally comprise a plate of a photoconductive material overcoated with a layer of a dielectric material. The photoconductive material may, for example, be amorphous selenium, lead oxide, cadmium sulphide, cadmium telluride, thallium bromide, mercuric iodide or similar materials which are suitable for x-ray imaging while applying high voltage bias. The dielectric material may be any suitable dielectric for such purposes, for example, parylene, polycarbonate, polyester and the like. In addition, as is known in the art, the x-ray imaging device is provided with a substrate on which the photoconductive plate is mounted. Such substrate may consist of any suitable material such as aluminum, ITO coated glass, a thin film transistor array (TFT), and the like. Finally, over the dielectric layer there is normally provided a thin layer of a conductive material which acts as the biasing electrode, it may be selected from gold, platinum, aluminum, chromium, indium tin oxide (ITO) or the like.

When an x-ray imaging device such as described above is used for imaging, it is normally positively biased and charges (electron-hole pairs) that are generated from x-ray absorbtion by the photoconductor will move under the applied electric field. Negative charges will move in the direction of the top positive electrode and will stop and accumulate at the photoconductor-dielectric interface. When erasure of such device takes place for subsequent re-use, a ghost will usually remain due to a non-uniform charge accumulation at the interface between the photoconductive plate and the dielectric layer. This non-uniform charge accumulation causes a non-uniform sensitivity within the x-ray imaging device that produces the ghost.

One way to eliminate such non-uniformity and ghosts is by uniformizing the charges at the interface. This is achieved by subjecting the x-ray imaging device simultaneously to a positive high voltage and to an erasing light and then turning off the voltage and thereafter the light. The sensitivity of the plate will be somewhat lower with this operation, but it will be uniform within the plate, allowing for the elimination of the ghosts.

If it is desired to keep the sensitivity high and in addition to uniformize the same, one can completely or essentially completely eliminate the negative charges at the interface by switching the high voltage from positive to negative polarity during the erasure process. This produces an essentially complete neutralization of the charges, provided the duration of the negative voltage is such that the number of positive charges generated to neutralize the negative charges at the interface is essentially equal to the number of said negative charges. If the duration of the negative voltage bias is exceeded, this may lead to an accumulation of positive charges at the interface which, if not corrected, could cause a large dark current to flow during the image capture process of the next reference frame. This, however, can be corrected by applying a positive voltage bias to the device without application of the light so as to stabilize the dark current. Thereafter, the imaging of the next reference frame can be safely performed.

When reference is made herein to high erasure voltage, it usually means a voltage of several thousand volts, for example, between 3000 V and 10,000 V for the positive voltage and between −100 V and −10,000 V for the negative voltage. The voltage employed will generally depend on the thickness of the photoconductor plate. The thicker the plate, the higher the voltage. The light used for erasure will normally have a spectral emission of 400–800 nm, preferably 450–600 nm, and a luminance of 5–500 cd/$m^2$, preferably 20–100 cd/$m^2$. Also, when it is stated that the ghosts are eliminated, this means that they are essentially not visible within the noise floor of a normal x-ray imaging system.

The invention, therefore, resides in the discovery that ghosts can be eliminated by erasing x-ray imaging devices with light (as this is usually done), but in the presence of high voltage, the polarity of which may be reversed during the erasure process to achieve essentially complete neutralization of the charges when this is desired.

BRIEF DESCRIPTION OF THE DRAWINGS

This invention will now be further described with reference to the appended drawings in which.

DETAILED DESCRIPTION OF THE INVENTION

Figure 1:
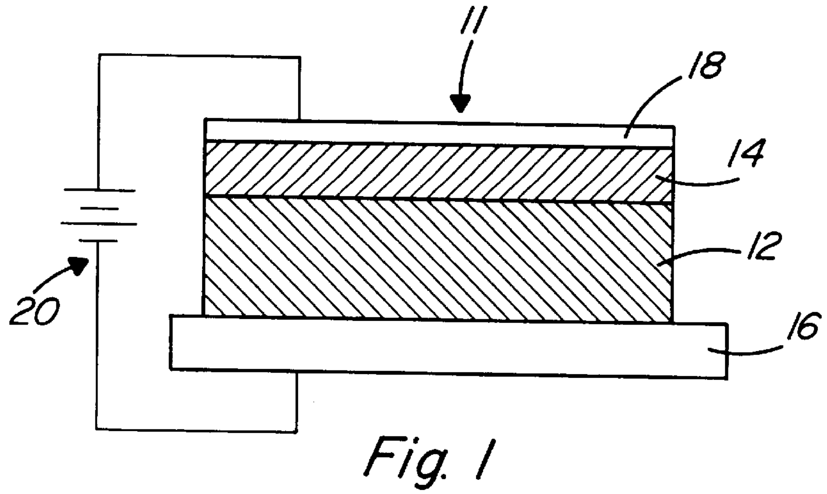
FIG. 1 is a cross-sectional enlarged view of an x-ray imaging device suitable for erasure in accordance with the present invention.

FIG. 1 illustrates an arrangement of an x-ray imaging device which is suitable for erasure in accordance with this invention. In this figure the x-ray imaging device 11 comprises a plate 12 of a photoconductive material, such as amorphous selenium, which is overcoated with a layer 14 of dielectric material, such as parylene. Plate 12 which may, for example, be 500 μm thick, is mounted on substrate 16 which, for example, can be made of ITO coated glass or TFT. on top of dielectric layer 14 which may, for example, be 40 μm thick, there is provided a conductive electrode 18 made, for instance, of ITO. The bias voltage is provided by the electrical set-up 20 illustrated schematically in this figure. This set-up 20 imparts the required high voltage during the imaging process, as well as during its erasure in accordance with the present invention. It should be noted that in all figures the same reference numbers are used to show the same elements.

Figure 2:
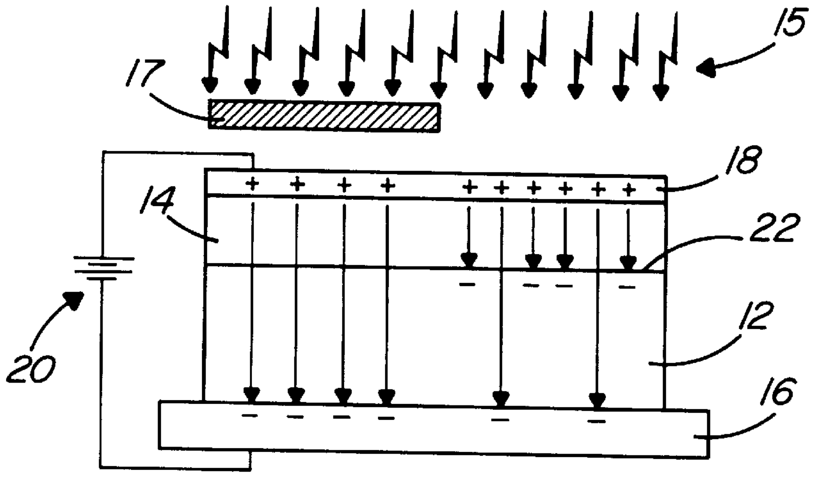
FIG. 2 illustrates an image frame charge distribution after x-ray exposure.
Figure 3:
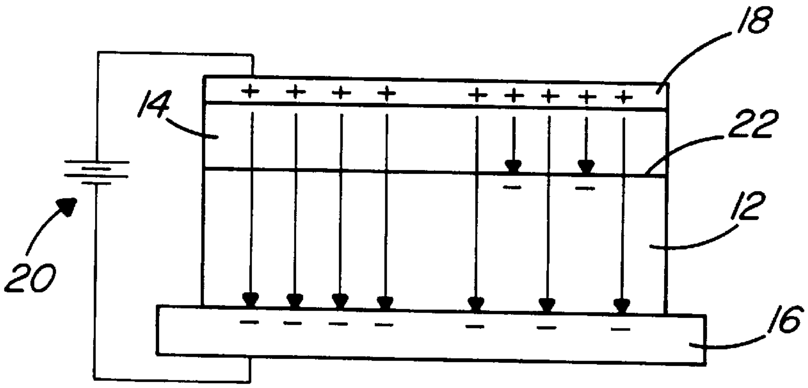
Fig. 3 (Prior Art.)
FIG. 3 illustrates a reference frame charge distribution after erasure with light alone according to the prior art.
Figure 4:
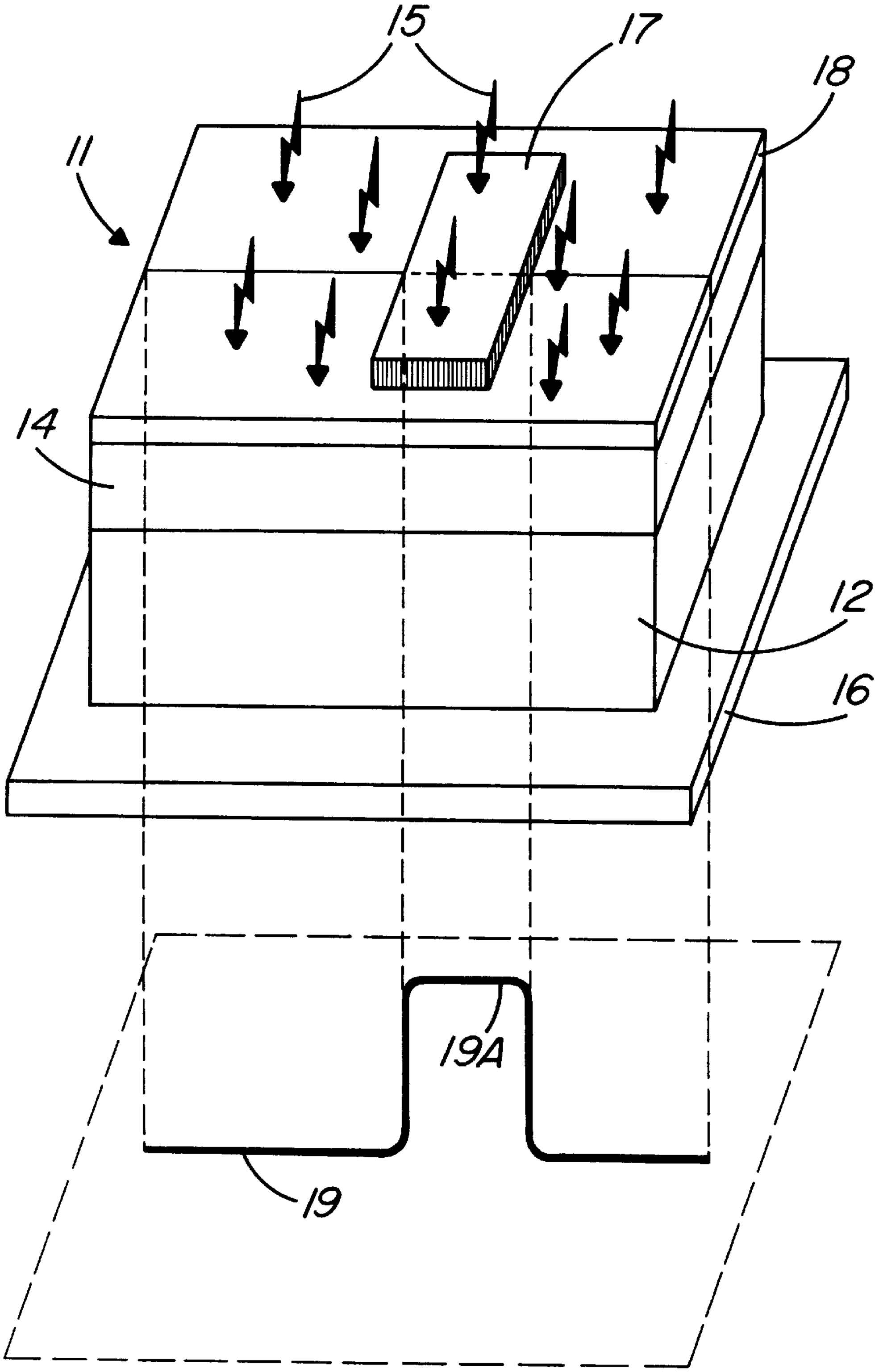
FIG. 4 is a view in perspective of an x-ray imaging arrangement also showing a linescan profile produced within the imaging x-ray plate.

During the imaging process, the charges are unevenly distributed as illustrated in FIG. 2. Due to the dielectric parylene layer 14, charges that are generated from the absorption of x-rays 15 and which move under applied electric field supplied by the set-up 20 will stop at the selenium-parylene interface 22. The negative charges accumulate at this interface 22 and contribute to reduce the electric field in the selenium layer on the next image frame. Only the area where the target-object 17 is located keeps an unchanged sensitivity. On the next image frame (after erasure with light alone) as shown in FIG. 3, this results in a more effective discharge on the area where the sensitivity is higher, i.e. where the target-object 17 was located in the previous image frame. This phenomenon is believed to explain the ghost effect observed when only light is used to erase the previous image. This is further illustrated in FIG. 4 where an x-ray imaging device 11 is shown in perspective. When the target-object 17 is placed on top of the conductive electrode 18 and a suitable electric field is applied, x-rays 15 will be absorbed by the photoconductive plate 12 which is mounted on substrate 16 and overcoated with dielectric layer 14. The linescan profile 19 resulting from such operation is reproduced within the broken-line frame shown under the device 11. There is an elevation 19A in this profile under the area where the target-object 17 is located, showing the variation of relative signal strength in that area.

Figure 5:
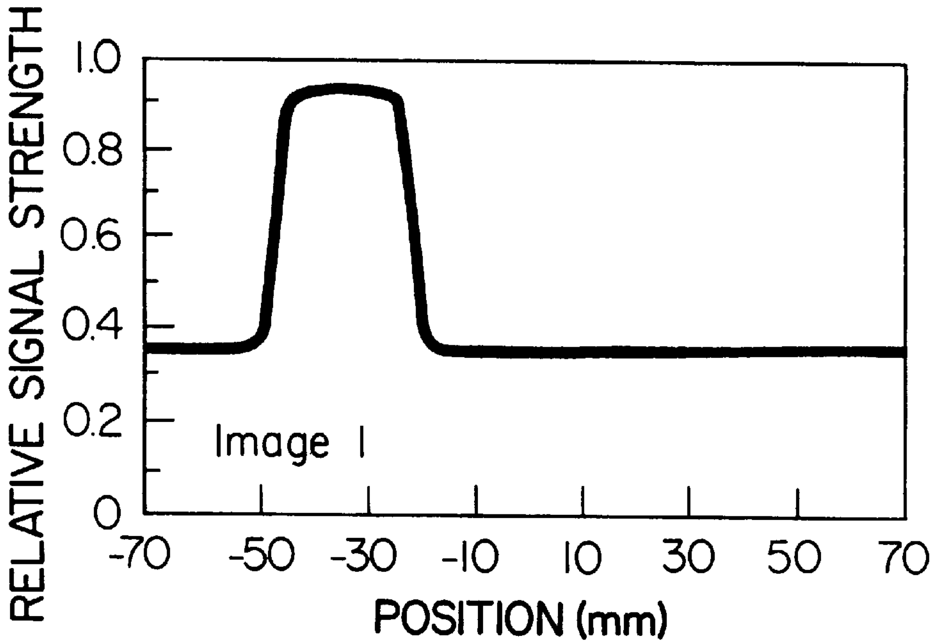
FIG. 5 is a graph that shows a ghost appearing when a second image was taken after erasure in accordance with the prior art.
Figure 5:
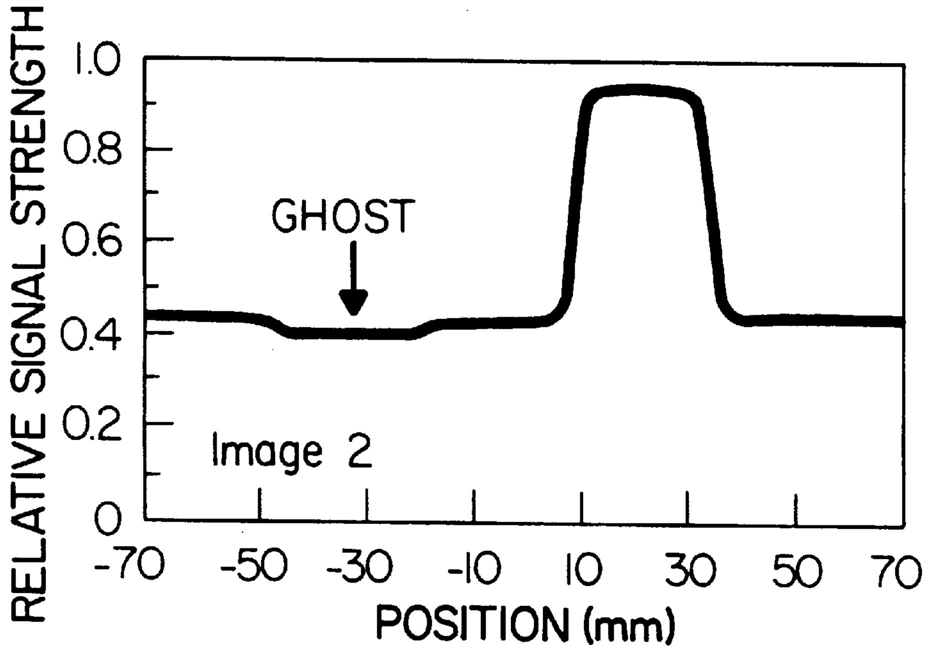

FIG. 5 shows two such linescans where after erasure of Image 1 using light alone as shown in FIG. 3, a new Image 2 is taken where the ghost effect observed is a reversed image of a preceding image on the actual image display. The ghost appears at the moment the actual image is taken so there is no possibility to get rid of it by a substraction operation of the reference frame. It is obvious that such ghosts are not acceptable in a medical diagnostic perspective. It should be noted that the linescans constitute a plot of a relative signal strength versus position of the target-object. The relative signal strength can be related, as is known, to the voltage, the electric charge, the grey scale and the like.

Figure 6:
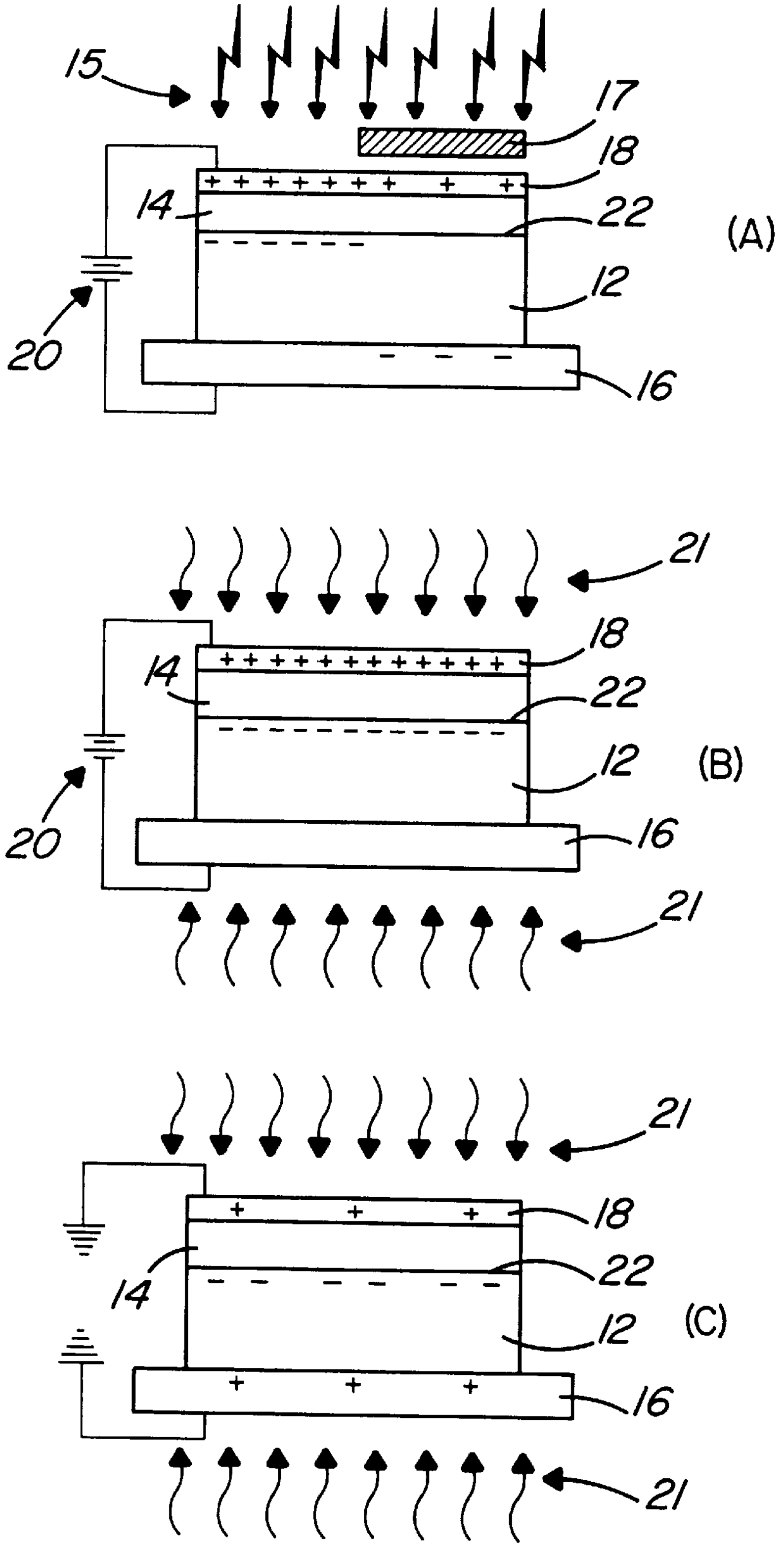
FIG. 6 illustrates one embodiment of the erasure method of the present invention.

FIG. 6 illustrates one embodiment of the method of the present invention where the ghost is eliminated by uniformizing and decreasing the number of charges at the interface 22. At point (A) of this figure there is shown the distribution of charges right after image formation by absorbtion of x-rays 15. Only the area where the target 17 was has an unchanged sensitivity, namely no negative charges at the interface 22. In order to proceed with the erasure of this device, a high positive voltage is turned on and then the erasing light 21 is turned on. This produces the charge distribution shown at point (B) wherein the number of charges at the interface 22 is uniform within the plate 12. At point (C) of FIG. 6 there is shown a charge distribution after the high voltage has been turned off while the light 21 is still applied to reduce the number of charges in the device. Then the light 21 is also turned off. There are still some negative charges remaining at the interface 22, which will reduce the sensitivity.

Figure 7:
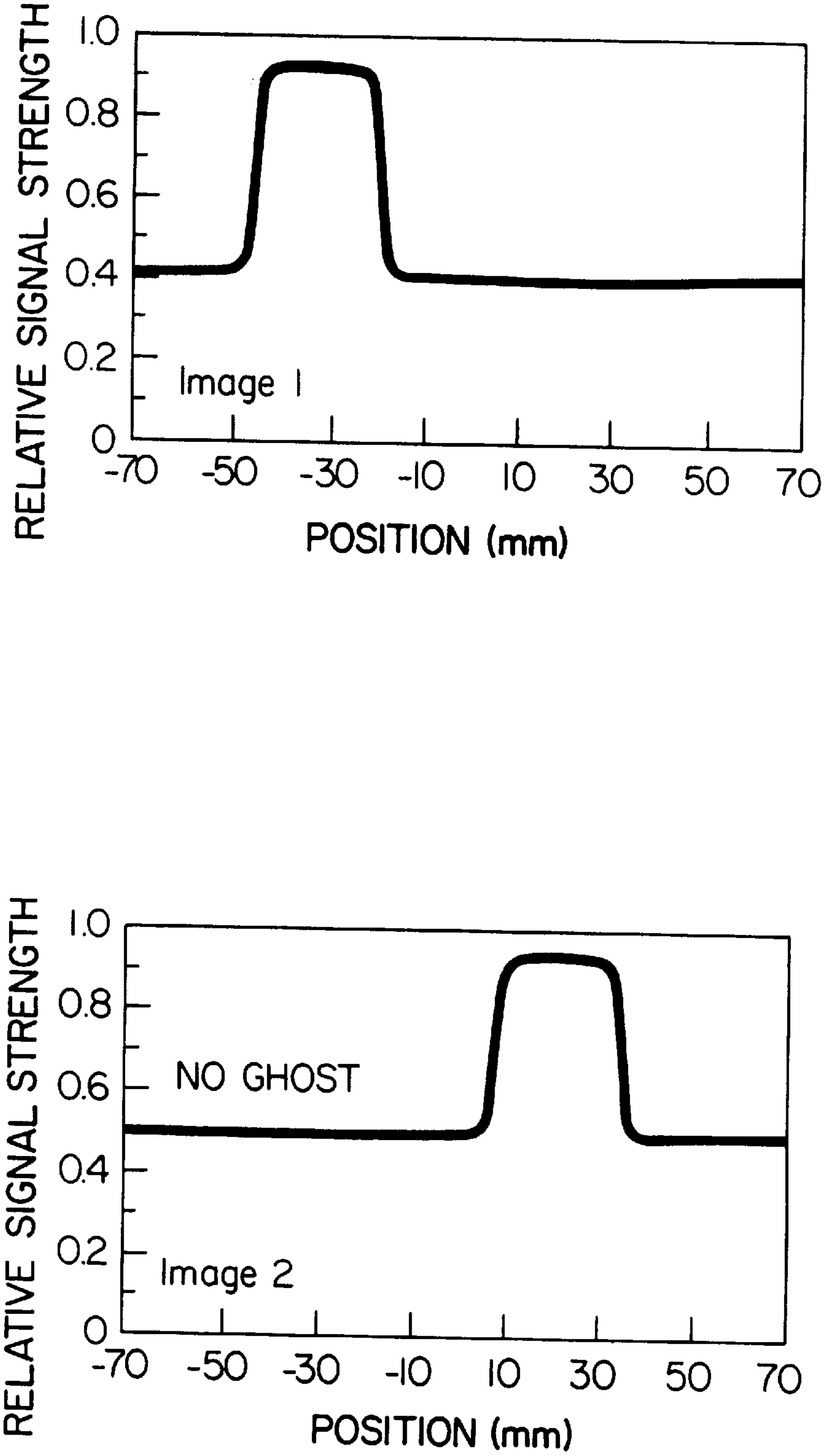
FIG. 7 is a graph that shows no ghost appeared when a second image was taken after erasure pursuant to the embodiment of FIG. 6.

FIG. 7 shows the result obtained from the method used according to FIG. 6. It shows the plot of relative signal strength as a function of position for the first and second images taken, where Image 2 was taken after erasure of Image 1 by the method described above in conjunction with FIG. 6. FIG. 7 shows that unlike the result shown in FIG. 5, in this case there is no ghost visible.

Figure 8:
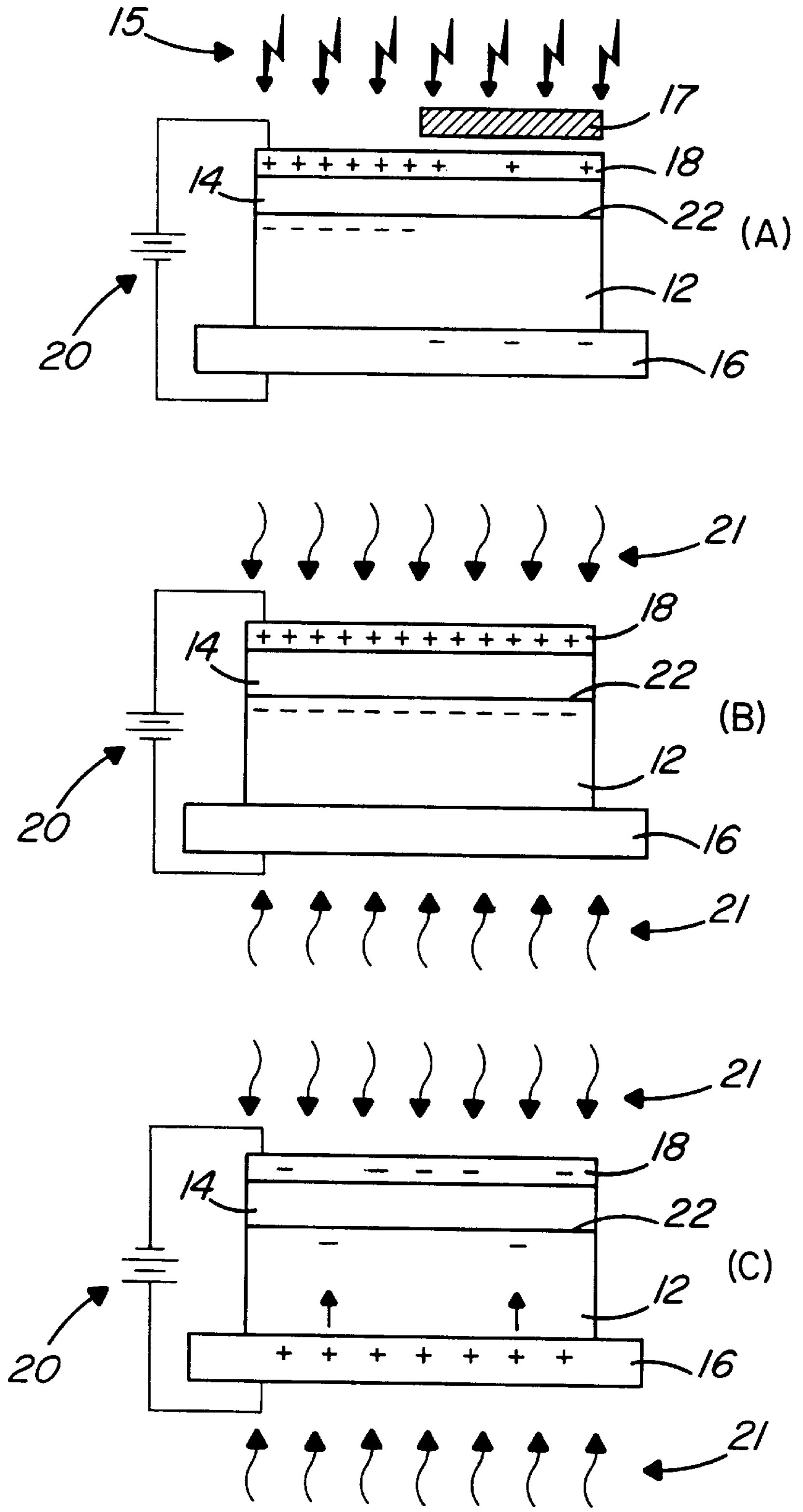
FIG. 8 illustrates another embodiment of the erasure method of the present invention.

Another embodiment of the erasure method of the present invention is illustrated in FIG. 8. Here, the distribution of the charges at point (A) is identical to the one shown in FIG. 6, i.e. it shows such distribution right after the image frame and only the area where the target was has an unchanged sensitivity without any negative charges at the interface 22. This device is erased by turning on a high positive voltage by set-up 20 and then turning on the light 21, thereby uniformizing the interface 22 as shown at point (B). However, in addition to this, the high voltage is switched from positive to negative polarity during the erasure operation for just long enough to neutralize the negative charges at the interface 22. This is followed by turning the high voltage off and then turning the light off. The resulting charge distribution is shown a point (C) of FIG. 8. This results in very few negative charges being left at the interface 22 which is a highly desirable effect.

Figure 9:
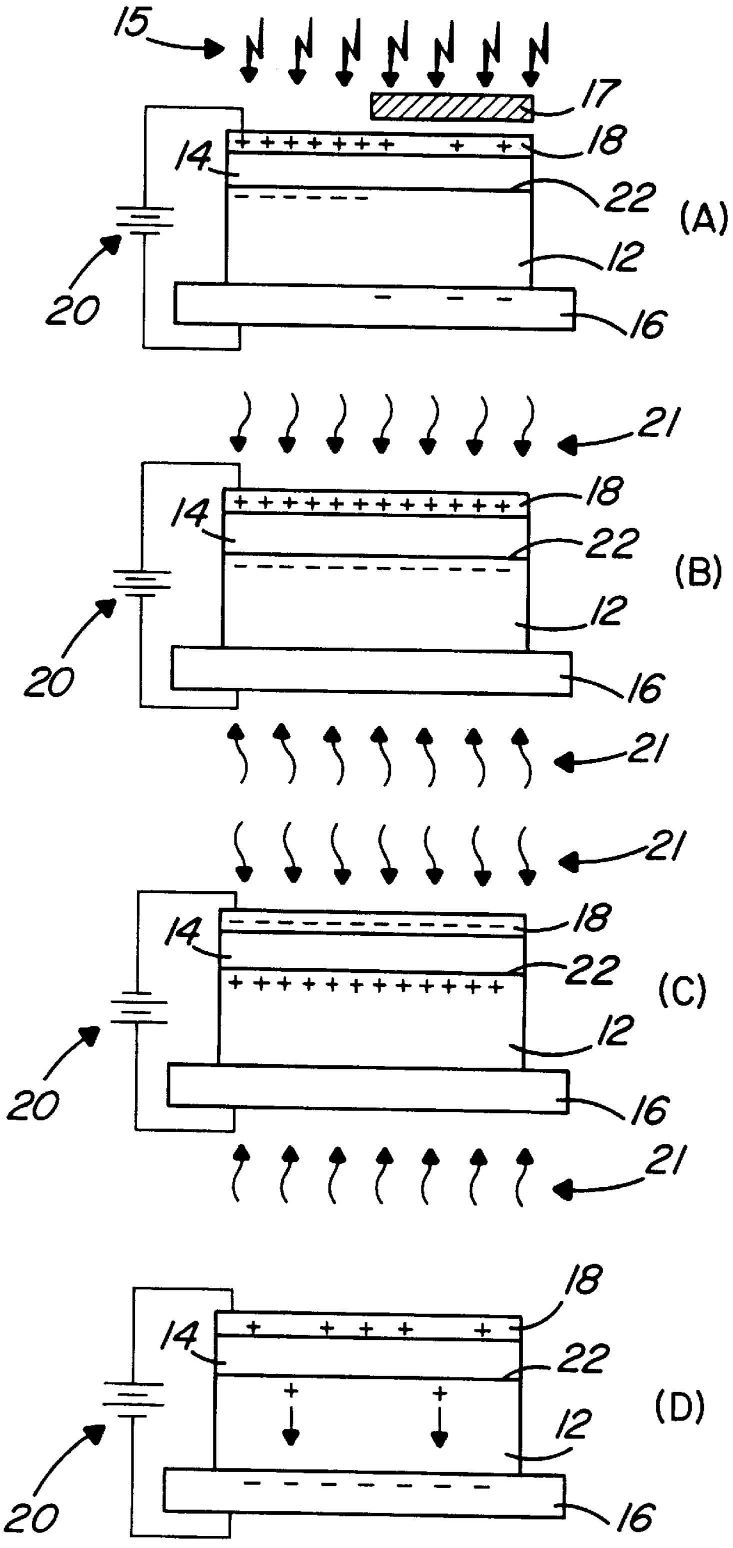
FIG. 9 illustrates an alternative embodiment to FIG. 8.

In FIG. 9 an alternative to the embodiment of FIG. 8 is illustrated. Here, the operations at points (A) and (B) are identical to those shown in FIG. 8. However, at point (C) the negative polarity voltage is maintained for a longer period of time than in FIG. 8 which produces accumulation of positive charges at interface 22. This, if left as such, would cause a large dark current to flow on the next reference frame which would not be satisfactory. In order to stabilize the dark current by removing the positive charges, the device is subjected to a high positive voltage bias without application of light as shown at point (D) of FIG. 9, before the next reference frame. This produces again a very satisfactory erasure of the x-ray device. The arrangement of FIG. 9 does not require as close a timing control for negative voltage bias as is required pursuant to FIG. 8.

As far as timing of high voltage and light is concerned, it can be readily determined for various situations, such as the thickness of the photoreceptor, the luminance of light, etc. A person skilled in the art will determine and optimize such timing for any particular operation. However, to give an example of appropriate timings the following is suggested.

If $\Delta t_1$ is the delay during which positive high voltage (PHV) is on before light is switched on;

$\Delta t_2$ is the time during which PHV is on while light is also on;

$\Delta t_3$ is the time during which negative high voltage (NHV) is on, when it is used; and $\Delta t_4$ is the delay during which the light remains on after high voltage is switched off.

Then suitable time ranges for the above situations could be as follows:

| | |
|---|---|
| $\Delta t_1$ = 0–10 sec | (if 0 then both the PHV and light are switched on simultaneously) |
| $\Delta t_2$ = 1–10 sec | |
| $\Delta t_3$ = 1–10 sec | (may need to be optimized as indicated with reference to FIG. 8) |
| $\Delta t_4$ = 1–10 sec. | |

Figure 10:
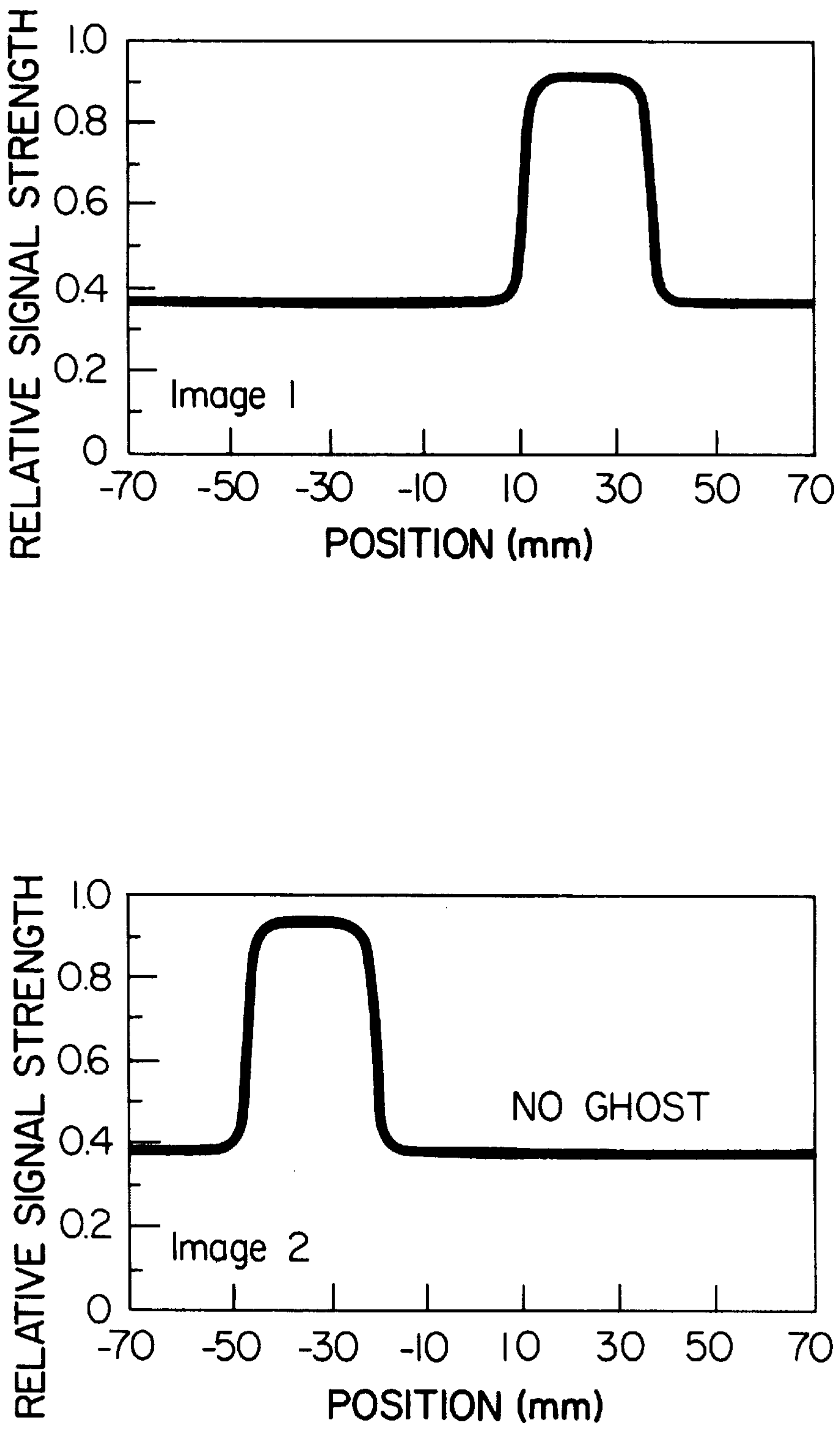
FIG. 10 is a graph showing that no ghost appeared when a second image was taken after erasure pursuant to the embodiment of FIG. 8 or FIG. 9.

FIG. 10 graphically illustrates the result obtained with the embodiments described in conjunction with FIG. 8 and FIG. 9, namely it shows no ghost in Image 2 and a sensitivity or relative signal strength similar to that of Image 1.

It should be understood that the invention is not limited to embodiments described above by way of illustration, but that it includes any erasure method using a combination of high voltage and light. The two key steps used within the novel method are: (1) the uniformization of the interface, which occurs when the high voltage is on and the light is on at the same time, and (2) the neutralization of charges accumulated at the interface, which is achieved by reversing the high voltage polarity while leaving the light on; this second step is optional and is required only when decrease in sensitivity is objectionable. Thus, any erasure method comprising one or both of the above steps falls within the scope of the present invention.

What is claimed is:

1. A method of erasure of an x-ray imaging device which uses high bias voltage of between 3000 V and 10,000 V of positive polarity or between −100 V and −10,000 V of negative polarity during the image capture process, which comprises simultaneously applying high voltage and light to the device so as to erase a previous image on said device.

2. A method as claimed in claim 1, in which the x-ray imaging device comprises a plate of a photoconductive material overcoated with a layer of dielectric material and the high voltage and the light are applied to said device so as to uniformize distribution of charges at the interface of said plate and said layer and also to reduce the number of said charges.

3. A method according to claim 2, in which the high voltage applied for the erasure has a positive polarity.

4. A method according to claim 3, in which the high voltage of positive polarity is applied for 1 to 10 seconds.

5. A method according to claim 3, in which the high voltage of positive polarity is reversed during the erasure and becomes a voltage of negative polarity.

6. A method according to claim 5, in which the voltage of negative polarity is applied for a period of time that is just sufficient to neutralize negative charges accumulated at the interface between the photoconductive material and the dielectric material.

7. A method according to claim 6, in which the time period of application of the voltage of negative polarity is between 1 and 10 seconds.

8. A method according to claim 5, in which the high voltage of negative polarity is applied for a period longer than required to neutralize negative charges accumulated at the interface between the photoconductive material and the dielectric material, whereby an accumulation of positive charges is produced at said interface, and thereafter a high positive voltage bias is applied to the device without application of light in order to remove said positive charges.

9. A method according to claim 5, in which the voltage of negative polarity is between −100 volts and −10,000 volts.

10. A method according to claim 3, in which the high voltage of positive polarity is between 3000 and 10,000 volts.

11. A method according to claim 2, in which the photoconductive material is amorphous selenium.

12. A method according to claim 2, in which the dielectric material is parylene.

13. A method according to claim 1, in which, upon completion of the erasure, the high voltage is turned off first and then the light is turned off.

14. A method according to claim 1, in which the light used for the erasure has a spectral emission of 400–800 nm and a luminance of 5–500 cd/$m^2$.

15. A method according to claim 1, in which the light used for the erasure has a spectral emission of 450–600 nm and a luminance of 20–100 cd/$m^2$.

* * * * *